United States Patent Office 3,020,303
Patented Feb. 6, 1962

3,020,303
PRODUCTION OF ALIPHATIC PHOSPHATE ESTERS
John A. Pianfetti, Charleston, and Paul L. Janey, Nitro, W. Va., assignors to FMC Corporation, a corporation of Delaware
No Drawing. Filed Mar. 25, 1960, Ser. No. 17,508
12 Claims. (Cl. 260—461)

This invention relates to the production of aliphatic phosphates including alkyl, alkenyl and alkoxyalkyl phosphates. The invention includes the production of such phosphates containing mixed alkyl, alkenyl and alkoxyalkyl substituents and relates particularly to tri-substituted phosphates such as the trialkyl, trialkenyl, trialkoxyalkyl or the mixed tri-substituted phosphoric acid esters containing such substituents.

In this specification all percentages and parts are given on a weight basis.

Trialkyl phosphates have been commonly made by reacting the appropriate alcohol with phosphorus oxychloride. Yields obtained by this process have been low, of the order of about 75% based on the alcohol and somewhat less based on the phosphorus oxychloride.

The reaction of an alcohol with an alkali metal or alkali metal hydroxide to form the alkali metal alcoholate and the reaction of the alcoholate with phosphorus oxychloride are known. Attempts heretofore made to apply these reactions to the production of trialkyl phosphates have resulted in poor yields and in off-color products, in some cases producing black trialkyl phosphates requiring an expensive and time-consuming distillation treatment for purification.

It is an object of this invention to provide a process for producing aliphatic phosphate esters, which process results in quality products in high yields.

It is a further object of the present invention to provide a process for producing trialkyl, trialkenyl, trialkoxyalkyl and mixed tri-substituted alkyl, alkenyl, and alkoxyalkyl phosphates, which process results in the production of products of good color in high yields, quantitative or near quantitative.

Other objects and advantages of the present invention will be apparent from the following detailed description thereof.

In accordance with this invention, aliphatic phosphate esters are prepared by a process involving the steps of (a) reacting an alkali metal hydroxide with an aliphatic alcohol having from 1 to 18 carbon atoms in the amount of from 3 to 4 mols of hydroxide and at least about 6 mols of alcohol per mol of phosphorus oxychloride utilized in step (b) while concurrently removing substantially all of the water formed in the reaction to produce a substantially anhydrous reaction mixture containing an alkali metal alcoholate, (b) reacting the mixture with the phosphorus oxychloride at temperatures within the range of from about 0° to 100° C., to produce a reaction mixture containing the phosphate ester of the aliphatic alcohol, and (c) separating the phosphate ester from the reaction mixture, while (d) simultaneously with steps (a) and (b) maintaining the reaction mixture in a non-oxidizing atmosphere and thus prevent discoloration of the phosphate product.

In accordance with a preferred embodiment of this invention, a trialkyl, trialkenyl, trialkoxyalkyl phosphate or mixed phosphate ester contianing alkyl, alkenyl or alkoxyalkyl substituents is prepared in good color and in high yield by a procedure involving the following steps:

(1) An alcohol having the formula

in which $R_1$, $R_2$ and $R_3$ are hydrogen or alkyl, alkenyl, or alkoxyalkyl radicals having collectively from 1 to 17 carbon atoms, is mixed at or about room temperature with a hydrocarbon azeotropic agent such as benzene, heptane, or naphtha, and a non-oxidizing atmosphere is created in the zone in which the mixing is effected, preferably by passing an inert gas through or over the mixture of the alcohol and the azeotropic agent. The amount of alcohol introduced into this zone is from about 6 to 20 mols per mol of phosphorus oxychloride with which the alcohol is subsequently reacted, as hereinafter explained. The amount of azeotropic agent is at least enough to effect substantially complete removal of water including that formed in the reaction mixture during the reaction of the alcohol with the alkali metal hydroxide.

(2) An alkali metal hydroxide in amount of from 3 to 4 mols is added to the mixture of alcohol and azeotropic agent. During this addition the temperature of the mixture is maintained below 40° C. and the reaction mixture is maintained in the non-oxidizing atmosphere, preferably by continuing the flow of the inert gas.

(3) The reaction mixture is then refluxed while continuing the flow of the inert gas therethrough or thereover, to maintain the non-oxidizing atmosphere throughout the reaction, until substantially all water in the reaction mixture including that formed is removed. This reflux distillation is controlled to insure that the reaction mixture at the end of this step is anhydrous or substantially anhydrous, i.e., does not contain more than about 0.5% of water, preferably not exceeding 0.1% water.

(4) The reaction mixture is then cooled to 50° C. or lower, preferably to a temperature within the range of from 25° to 50° C. while maintaining the aforesaid non-oxidizing atmosphere by continuing to pass the inert gas through the reaction zone.

(5) Phosphorus oxychloride is then added to the reaction mixture at a rate to maintain the temperature below 100° C., preferably within the range of from 30° to 60° C. while continuing the flow of the inert gas to maintain the aforesaid non-oxidizing atmosphere.

(6) The phosphate ester thus produced is recovered by adding enough water to dissolve the alkali metal salt formed. After the addition of the water the non-oxidizing atmosphere need not be maintained and the flow of the inert gas to the reaction zone is discontinued. The crude ester is separated from the salt solution.

The crude ester may be purified in any desired manner, for example, by steam distillation to remove unreacted alcohol which can be recycled to the process and thus beneficially utilized.

The process may be carried out batchwise or continuously by first mixing the reactants, as hereinafter disclosed, to form the alcoholate and then adding to a flowing stream of alcoholate solution in the alcohol the phosphorus oxychloride while maintaining non-oxidizing conditions throughout both stages of these reactions. The alcohols employed in the process include alkanols such as methanol, ethanol, i-propanol, n-butanol, s-butanol, amyl alcohol, 2-ethylhexanol, octanol, n-dodecanol, and octadecanol, alkenyl substituted carbinols such as allyl alcohol and methallyl alcohol and alkoxyalkyl substituted carbinols such as 2-methoxyethanol, 2-ethoxy ethanol (Cellosolve), 2-butoxyethanol (Butyl Cellosolve), 2-i-propoxyethanol and 2-hexoxyethanol, which latter mixed carbinols have chain lengths ranging from 2 to 18 carbon atoms.

The alcohols are employed in amounts of at least about 6 mols per mol of phosphorus oxychloride utilized, and preferably in amounts of from 6 to 20 mols. The use of stoichiometric amounts of the alcohols, viz. about 3 mols per mol of phosphorus oxychloride, results in poor phosphate yields, usually not exceeding 60%. However, when at least about 6 mols of alcohol per mol of the phosphorus oxychloride are used, phosphate yields as high as 99% have been obtained.

The alcoholysis reaction is carried out in the presence of an azeotropic agent such as benzene, heptane or naphtha, the latter boiling between 110 and 150° C., present in sufficient amount to effect substantially complete dehydration of the reaction mixture during reflux. Amounts of azeotropic agent ranging from 5% to 40% of the reaction mixture give good results.

The alcohol is mixed with the azeotropic agent at about room temperature in a closed reactor and the mixture is maintained in a non-oxidizing atmosphere. The maintenance of such as atmosphere throughout the subsequent alcoholysis and phosphorylation reactions, terminating with the separation in aqueous solution of the alkali metal salt formed in the esterified reaction mixture, is an important feature of the present invention. The use of a non-oxidizing atmosphere prevents the production of discolored blackened phosphate esters, which are believed to result from the formation of oxidation-condensation products of the aliphatic alcohol. Such undesirable discoloration can only be removed, when formed, by an expensive vacuum distillation process. However, by maintaining such non-oxidizing atmosphere, such discoloration of the phosphate products is minimized, if not completely prevented.

The non-oxidizing atmosphere is preferably created and maintained by blowing an inert gas through the mixture of the alcohol and the azeotropic agent and continuing the flow of such gas throughout the alcoholysis and phosphorylation procedures; the gas flow is terminated after water is added to the esterified reaction mixture to separate (in aqueous solution) the alkali metal salt formed in the reaction with the phosphorus oxychloride from the crude phosphate ester. Alternatively, the non-oxidizing atmosphere may be created by blowing the inert gas through the reactor, and thereafter maintained by keeping the reactor sealed to avoid contact with the outer atmosphere. Inert gases which can be employed to create and maintain a non-oxidizing atmosphere include nitrogen, carbon dioxide, natural gas, methane, or other low boiling hydrocarbons.

A non-oxidizing atmosphere may also be created by any of the well known procedures for removing oxygen, e.g. by vacuum removal, or by displacing the oxygen with a low boiling inert liquid, such as pentane, followed by evaporating the pentane to evacuate the reactor chamber. Thereafter, the reaction mixture is maintained in the non-oxidizing atmosphere by sealing the reactor vessel from the outside atmosphere.

The alkali metal hydroxide, which is used in amounts ranging from 3 to 4 mols per mol of the phosphorus oxychloride, is added to the mixture of the alcohol and the azeotropic agent for reaction to form the alkali metal alcoholate. During this addition temperature increase above about 40° C. is avoided either by controlling the rate of addition or cooling the reaction mixture. Preferably, the formation of the alcoholate takes place under atmospheric pressure conditions; superatmospheric pressure conditions may be employed, if desired.

By using an amount of alkali metal hydroxide within the above limits an alkali metal alcoholate solution in the reacting alcohol results in which all of the alcoholate is in solution. This facilitates the subsequent reaction with the phosphorus oxychloride. As the alkali metal hydroxide, sodium, potassium or lithium hydroxides are employed; sodium hydroxide is preferred for economic reasons.

Following or during the addition of the alkali metal hydroxide, the reaction mixture is refluxed in the non-oxidizing atmosphere and the mixture thereby dehydrated. Refluxing is carried out at temperatures below those at which decomposition of the reactants and the alcoholate occurs, i.e., at temperatures within the range of from 25° to 250° C., preferably from 90° to 140° C. Refluxing of the reaction mixture is continued until the reaction mixture contains no more than about 0.5%, preferably 0.1% of water; this takes place in from 4 hours to 2 weeks depending upon the reactants, the column efficiency and the temperature at which the refluxing is conducted. It is important to remove substantially all of the water from the reacting mixture to produce high yields of the desired ultimate product.

During the refluxing of the reaction mixture, preferably iron in finely divided form, e.g. filings, is added to improve the color of the phosphate ester product. The amounts of iron particles thus added may vary from about 0.1 grams to 10 grams per mol of the phosphorus oxychloride added thereafter, and preferably from about 1-4 grams per mol of phosphorus oxychloride. While the explanation for the improvement in color obtained by the addition of the iron particles is not known, it is believed that the iron acts as an acceptor for chromophoric groups or oxygenating radicals.

It will be appreciated that this invention is not limited to the above explanation, nor is it limited to the addition of iron particles to obtain improvement in color of the phosphate ester; products of satisfactory color are obtainable by the process of this invention in which no iron particles are added to the reaction mixture during the refluxing.

To the substantially anhydrous reaction mixture thus produced is added the phosphorus oxychloride while maintaining the reaction mixture in the non-oxidizing atmosphere, as by continuing the flow of the inert non-oxidizing gas. The reaction of the alcoholate with the phosphorus oxychloride takes place rapidly. This reaction is exothermic; the addition of the oxychloride should be controlled and/or the reaction mixture cooled to maintain the reaction mixture within the range of 0° to 100° C., preferably from about 30° to 60° C. It is important that the reaction be conducted at a temperature below 100° C. because higher temperatures result in decomposition and a decrease in the effective yield of the phosphate ester.

The separation of the phosphate ester from the reaction mixture is effected by adding water to dissolve the alkali metal halid produced in the preceding reaction, thereby creating a hydrocarbon layer and an aqueous layer, and thereafter separating the phosphate-containing hydrocarbon layer from the aqueous salt solution. The non-oxidizing atmosphere is preferably maintained until after the addition of the water. By so doing products of good color are obtained. The non-oxidizing atmosphere produced by the flow of the inert gas may, however, be terminated just before the addition of the water, i.e., at the completion of the phosphorus oxychloride reaction with the alcoholate, and still obtain products of reasonably good color.

The phosphate is thereafter purified by steam stripping or other suitable treatment to remove unreacted alcohol which, if desired, is recycled for reaction with the alkali metal hydroxide.

Phosphates thus prepared include tri-i-propyl phosphate, tri-s-butyl phosphate, tri-n-butyl phosphate, triamyl phosphate, tri-n-dodecyl phosphate, tris-butoxyethyl phosphate, triallyl phosphate and mixed phosphates such as butoxyethyl methyl phosphate, butoxyethyl butyl phosphate, butoxyethyl i-propyl phosphate, butoxyethyl methoxyethyl phosphate, etc.

The following examples are given to illustrate the process of this invention. It will be understood the invention is not limited to these examples:

EXAMPLE I

Tris-butoxyethyl phosphate

Butoxyethanol (Butyl Cellosolve; 1416 lb.; 12 lb. mols; 191.5 gal.; 300% excess) and naphtha (150 lb.; 24 gal.) were charged to the reactor. Nitrogen gas was blown through the mixture as it was charged. Sodium hydroxide (246 lb. of 50% solution; 19.4 gal.; 2.5% excess) was added, and the nitrogen flow was continued for 30 minutes to remove the air from the mixture. The above was done at room temperature. There was a slight rise in temperature when the sodium hydroxide was added because of the exothermic heat of reaction. The temperature rose from 25° to about 40° C.

After the charge had been blown with nitrogen for 30 minutes, heat was applied until the mixture began to reflux (about 130° C.). Two layers formed upon condensation of the overhead vapor; a water layer, and an organic layer. The refluxing was continued for 6 hours with the water layer removed and the organic layer returned to the reactor. 174 lb. of water were thus removed. The reaction mixture was tested with Karl Fischer reagent from time to time to insure the substantially complete removal of water from the reaction mixture. In this example the product was found anhydrous, as shown by KF reagent test at the end of 6 hours.

The reaction mixture was then cooled to 50° C. Phosphorus oxychloride (153.5 lb.; 11 gal.) was added while the temperature of the reaction mixture was maintained below 50° C. After all the $POCl_3$ had been added, the mixture was stirred for an hour, the temperature of the reaction mixture during the stirring was below 50° C. The flow of nitrogen gas was continued throughout this treatment.

Thereafter water (702 lb.; 58.5 gal.) was added to dissolve the sodium chloride formed. This amount of water resulted in a 20% sodium chloride solution. After the water had been added and the sodium chloride had been dissolved, the nitrogen flow was stopped. The drowned crude was separated from the salt solution which contained approximately 1% butoxyethanol.

The drowned crude was steam stripped. The resultant product was washed twice with an equal amount of water (400 lb.) to remove dissolved salts, and then dried by heating to about 130° C. The product yield was 95%.

EXAMPLE II

*Tris-butoxyethyl phosphate*

The procedure of Example I was repeated, substituting 6 mols of butoxyethanol for the 12 mols reacted in Example I. The yield of tris-butoxyethyl phosphate was 90%.

EXAMPLE III

*Tri-n-butyl phosphate* n-Butanol (12 mols) was placed in a flask fitted with a stirrer, thermowell, nitrogen inlet, phosphorus oxychloride inlet, a reflux condenser, and trap for separating the condensed water from the organic azeotropic agent. Sodium hydroxide (50%; 3.13 m.) and benzene (500 ml.) as the azeotropic agent were added rapidly. Nitrogen gas was passed through the mixture while heating gently to reflux. The condensate separated into two layers. The benzene layer was returned to the system, and the water layer was removed periodically, until an analysis of the flask contents showed about 0.25% water.

The mixture was cooled, and phosphorus oxychloride (1 m.) was added slowly while controlling the temperature around 50° C. When the oxychloride had been added, the mixture was stirred for 30 minutes, after which sufficient water (700 ml.) to give a 20% NaCl solution was added with vigorous stirring.

Flow of nitrogen was continued during the addition of the oxychloride, the subsequent stirring and addition of water. The flow of the nitrogen was then interrupted and stirring of the reaction mixture stopped.

The two layers formed after the water addition were separated. The organic layer was distilled, ultimately under reduced pressure, to remove excess alcohol, benzene and water, and then washed twice with an equal volume of water to remove salts. The product was dried by heating to 130° C. A yield of 92% was obtained. Properties were: N D/25—1.422; sp. gr. 25/4° C.—0.973; color below 50, Pt—Co scale.

EXAMPLE IV

*Tris(2-ethylhexyl)phosphate*

The procedure of Example III was followed using:

| | | |
|---|---|---|
| 2-ethylhexanol | m__ | 15 |
| Sodium hydroxide (50%) | m__ | 3.22 |
| Heptane | ml__ | 276 |
| $POCl_3$ | m__ | 1.0 |

A yield of 94% was obtained. Properties were: N D/25—1.4410; sp. gr. 20/20° C.—0.925.

EXAMPLE V

*Tri-n-dodecyl phosphate*

The procedure of Example III was followed using:

| | | |
|---|---|---|
| n-Dodecanol | m__ | 12 |
| Sodium hydroxide (50%) | m__ | 3.1 |
| Heptane | ml__ | 300 |
| $POCl_3$ | m__ | 1.0 |

A yield of 90% was obtained. Properties were: sp. gr. 20/20° C.—0.905; phosphorus, 5.00% found versus 5.15% theoretical.

EXAMPLE VI

*Triallyl phosphate*

The procedure of Example III was followed using:

| | | |
|---|---|---|
| Allyl alcohol | m__ | 12 |
| Sodium hydroxide (50%) | m__ | 3.2 |
| Heptane | ml__ | 300 |
| $POCl_3$ | m__ | 1.0 |

Fresh allyl alcohol was added, and an equal volume of allyl alcohol and water was removed as a homogeneous solution, during the several cycles of the formation of the sodium allylate. The refluxing of the reaction mixture after all of the allyl alcohol had been added with removal of water as in Example III was continued until the water content was reduced to 0.4%. After reaction with phosphorus oxychloride and recovery of the product as in Example III, an 84% yield of product was obtained, having the following properties: N D/25—1.4472; sp. gr. 25/4° C.—1.076; phosphorus, 13.8% found versus 14.2% theory.

EXAMPLE VII

*Mixed butoxyethyl methoxyethyl phosphate*

The procedure of Example III was followed using:

| | M. |
|---|---|
| Methoxyethanol | 12 |
| Butoxyethanol | 12 |
| Sodium hydroxide | [1]6.4 |
| $POCl_3$ | 2.0 |

[1] 3.2 mols for each alcoholate.

The two sodium alkoxides were prepared separately following the procedure of Example III and were mixed prior to reaction with phosphorus oxychloride, as in Example III. A yield of 81% was obtained. Properties were: sp. gr. 20/20° C.—1.062; N D/25—1.4363; phosphorus—found, 8.70% versus theory, 9.25%.

EXAMPLE VIII

*Mixed butoxyethyl butyl phosphate*

The procedure of Example VII was followed using:

| | M. |
|---|---|
| n-Butanol | 12 |
| Butoxyethanol | 12 |
| Sodium hydroxide | [1]6.4 |
| $POCl_3$ | 2.0 |

[1] 3.2 mols for each alcoholate.

A yield of 93% was obtained. Properties were: sp. gr. 20/20° C.—1.002; N D/25—1.4320; phosphorus found, 8.99 versus 9.38% theoretical.

EXAMPLE IX

*Triamyl phosphate*

The Example III procedure was followed using:

| | | |
|---|---|---|
| Amyl alcohol (mainly 1-pentanol with a small fraction of branched primary pentanols) | m | 24 |
| Sodium hydroxide (46%) | m | 6.2 |
| Heptane | ml | 300 |
| $POCl_3$ | m | 2 |

A yield of 95% was obtained. Properties were: Color—50 Pt—Co; acidity, ml.—0.1 N sodium hydroxide 10 g. sample=0.5; sp. gr. 20/20° C.—0.956; N D/25—1.4282; phosphorus, 10.03% versus 10.6% theoretical.

EXAMPLE X

*Tri-s-butyl phosphate*

The procedure of Example III was followed using:

| | | |
|---|---|---|
| s-Butanol | m | 12 |
| Sodium hydroxide (25%) | m | 3.1 |
| Heptane | ml | 300 |
| $POCl_3$ | m | 1 |

An 85% product yield was obtained, having a specific gravity of 0.960 at 25/4° C., a phosphorus content of 11.5% versus 11.65% theory, a color below 100 (Pt—Co), and boiling at about 115° C. at 5 mm.

EXAMPLE XI

*Tri-i-propyl phosphate*

The procedure of Example III was followed using:

| | | |
|---|---|---|
| Isopropanol | m | 12 |
| Benzene | ml | 300 |
| Sodium hydroxide (50%) | m | 3.1 |
| $POCl_3$ | m | 1 |

The reflux operation was continued in this case until 0.4% water remained in the reaction flask. The esterification was completed and the phosphate was dried. An 85% yield of product was obtained, having a specific gravity of 0.985 at 25/4° C., a phosphorus content of 13.5% versus theory of 13.8%, a color below 100 (Pt—Co), boiling at about 84° C. at 5 mm.

EXAMPLE XII

*Tris-butoxyethyl phosphate—No iron added*

The procedure of Example III was followed using:

| | | |
|---|---|---|
| Butoxyethanol | m | 12 |
| Sodium hydroxide (50%) | m | 3.1 |
| Heptane | ml | 300 |
| $POCl_3$ | m | 1 |

The phosphate product was produced at a yield of about 95%. The color of the product was 75 on a standard (Pt—Co) color scale.

EXAMPLE XIII

*Trisbutoxyethyl phosphate—Iron particles added for color removal*

The procedure of Example XII was repeated with the same amounts of materials as utilized therein, except that 2 grams of iron filings were added to the mixture while it was heated under reflux. A product yield of 95% was obtained, the color of which product was 40 (Pt—Co).

By comparison of Examples XII and XIII it will be noted that products having lower color values, i.e., products having minimum discoloration, are obtained with the process of the present invention when iron particles are added to the reaction mixture therein.

The products produced in the above examples are all of good color and meet or better existing product specifications.

It will be noted that the present invention provides a process for preparing aliphatic phosphate esters from aliphatic alcohols, alkali metal hydroxides and phosphorus oxychloride in good color and in high yields.

Since different embodiments of the invention may be made without departing from the scope thereof, it is intended that all matter contained in the above description shall be interpreted as illustrative and not in a limiting sense.

What is claimed is:

1. The process of preparing aliphatic phosphate esters comprising the steps of (a) reacting a mixture containing from 3 to 4 mols of an alkali metal hydroxide and at least about 6 mols of an aliphatic alcohol having from 1 to 18 carbon atoms per mol of phosphorus oxychloride employed in step (b) while concurrently removing substantially all of the water formed in said reaction to produce a substantially anhydrous reaction mixture containing an alkali metal alcoholate, (b) reacting said mixture with phosphorus oxychloride at a temperature within the range of 0° to 100° C. to produce a product mixture containing the phosphate ester of said alcohol, and (c) separating said ester from said product mixture, while (d) maintaining said reaction mixture in a non-oxidizing atmosphere simultaneously with steps (a) and (b).

2. In a process of preparing aliphatic phosphate esters comprising the steps of (a) reacting a mixture containing an alkali metal hydroxide and an aliphatic alcohol having from 1 to 18 carbon atoms while concurrently removing substantially all of the water formed in said reaction to produce a substantially anhydrous reaction mixture containing an alkali metal alcoholate, (b) reacting said reaction mixture with phosphorus oxychloride to produce a product mixture containing the phosphate ester of said alcohol, and (c) separating said phosphate ester from said product mixture, the improvement comprising utilizing in step (a) from 3 to 4 mols of alkali metal hydroxide and at least about 6 mols of aliphatic alcohol per mol of phosphorus oxychloride and carrying out the reaction in step (b) at a temperature within the range of 0° to 100° C., while simultaneously maintaining a non-oxidizing atmosphere throughout the conduct of steps (a) and (b).

3. The process of preparing a phosphate ester comprising the steps of (a) reacting a mixture containing an alkali metal hydroxide with an aliphatic alcohol having the formula

$R_1$, $R_2$ and $R_3$ being selected from the group consisting of hydrogen and alkyl, alkenyl and alkoxyalkyl radicals having from 1 to 17 carbon atoms, from 3 to 4 mols of said hydroxide and at least about 6 mols of said alcohol being used per mol of phosphorus oxychloride employed in step (b), while concurrently removing substantially all of the water formed in said reaction to produce a substantially anhydrous reaction mixture containing an alkali metal alcoholate, (b) reacting said mixture with phosphorus oxychloride at a temperature within the range of 0° to about 100° C. to produce a product mixture containing a phosphate ester having the formula

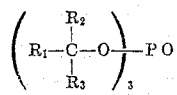

where $R_1$, $R_2$ and $R_3$ are as defined above, and (c) separating said ester from said product mixture, while (d) simultaneously with steps (a) and (b) maintaining a non-oxidizing atmosphere.

4. The process of preparing a trisubstituted phosphate ester having the formula

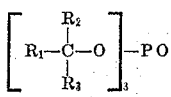

in which $R_1$, $R_2$ and $R_3$ are each selected from the group consisting of hydrogen and alkyl, alkenyl and alkoxyalkyl radicals having from 1 to 17 carbon atoms, which process comprises the steps of: (1) reacting an alcohol having the formula

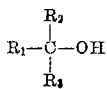

wherein $R_1$, $R_2$ and $R_3$ are as defined hereinabove, in an amount of from about 6 to 20 mols per mol of phosphorus oxychloride used in step (4) with from 3 to 4 mols of an alkali metal hydroxide while maintaining the temperature of the resulting reaction mixture below 40° C.; (2) refluxing said reaction mixture to remove substantially all the water contained therein; (3) cooling said reaction mixture to a temperature not exceeding 50° C.; (4) adding phosphorous oxychloride to said mixture while maintaining the temperature within the range of 0° to 100° C. to produce a product mixture containing said phosphate ester; (5) separating said ester from said product mixture; (6) concurrently with steps (1), (2), (3) and (4) removing air and maintaining said mixtures in a non-oxidizing atmosphere to prevent discoloration of said phosphate ester.

5. The process as defined in claim 4, in which said alcohol and said alkali metal hydroxide are reacted in the presence of a hydrocarbon azeotropic agent and said agent is present in an amount sufficient to effect substantially complete removal of the water from said reaction mixture.

6. The process as defined in claim 5, in which the azeotropic agent is selected from the group consisting of benzene, heptane and naphtha.

7. The process as defined in claim 4, in which the reaction mixture in step (3) is cooled to a temperature of from about 25°–50° C. and the temperature in step (4) is maintained between about 30° and 60° C.

8. The process as defined in claim 4, in which said non-oxidizing atmosphere is created by flowing an inert gas continuously over said reaction mixture.

9. The process as defined in claim 8, in which said product mixture contains an alkali metal chloride and in which said ester is separated from said product mixture in step (5) by the steps of adding water to said mixture to dissolve said chloride and separating said ester from the resulting aqueous solution of said chloride.

10. The process as defined in claim 9, in which said non-oxidizing atmosphere is terminated by discontinuing the flow of said inert gas after adding the water to said product mixture to dissolve said alkali metal chloride.

11. The process as defined in claim 8, wherein said inert gas is selected from the group consisting of nitrogen, carbon dioxide, natural gas and methane.

12. The process as defined in claim 4, in which the refluxing of the reaction mixture in step (2) is carried out in the presence of finely divided iron particles.

References Cited in the file of this patent

UNITED STATES PATENTS 2,575,225    Manske et al. _____ Nov. 13, 1951

FOREIGN PATENTS 522,732    Canada _____ Mar. 18, 1956